UNITED STATES PATENT OFFICE.

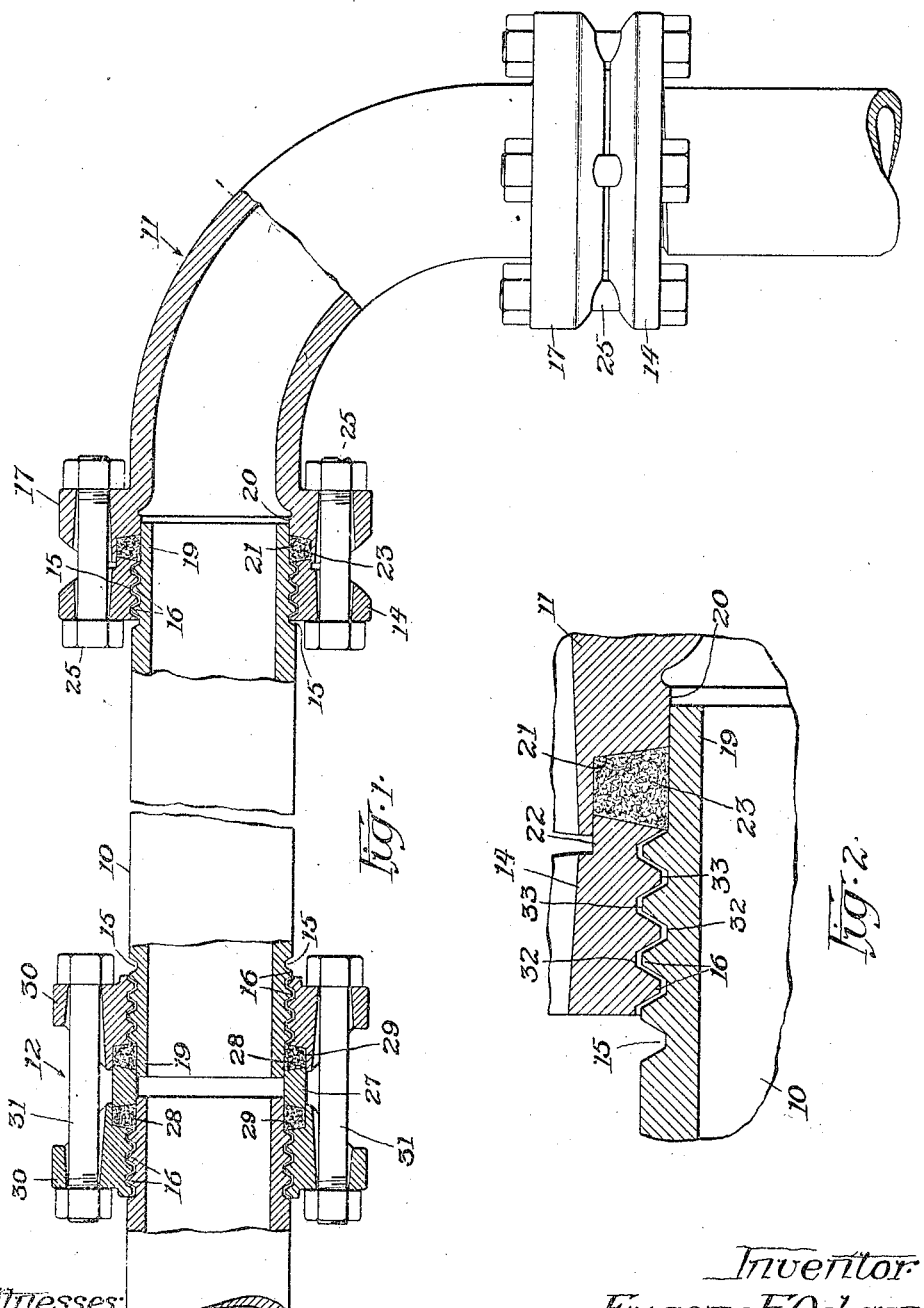

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

EXPANSION-JOINT FOR PIPE-LINES.

944,273.  Specification of Letters Patent.  Patented Dec. 28, 1909.

Application filed July 26, 1909. Serial No. 509,542.

*To all whom it may concern:*

Be it known that I, EUGENE F. OSBORNE, a citizen of the United States, and a resident of Chicago, in the county of Cook and State of Illinois, have invented certain new and useful Improvements in Expansion-Joints for Pipe-Lines; and I do hereby declare that the following is a full, clear, and exact description thereof, reference being had to the accompanying drawings, and to the numerals of reference marked thereon, which form a part of this specification.

This invention relates to a provision of means for permitting endwise movement of pipe lengths of a line of piping, relatively to joint and other fittings by which the pipe lengths are connected in the piping line to accommodate longitudinal movement of said pipe lengths to such fittings as required to compensate for the expansion and contraction of the piping under varying degrees of temperature.

The invention consists in the matters hereinafter set forth and more particularly pointed out in the appended claims.

In the drawings, Figure 1 is a broken view, partially in elevation and partially in section, of a line of piping and associated fittings embodying my invention. Fig. 2 is an enlarged fragmentary detail, illustrating more fully the essential features of the invention.

In the construction shown for effecting the results described, the pipe is provided at its end with an exterior spiral groove and an intervening spiral abutment, in the nature of a screw-thread, and the joint member through which the pipe end extends is provided with a complemental interior spiral groove of the same pitch as, and arranged to receive the exterior spiral abutment of, the pipe. The pipe is inserted into the spirally grooved joint member by turning it thereinto in a manner to interlock the spiral abutments of the interfitting parts so as to prevent the pipe being withdrawn directly from the joint member by a simple movement of the pipe in the direction of its axis. The said projections are made of a thickness, longitudinally of the pipe less than the like dimensions of the grooves so as to permit slight longitudinal movement of the pipe relatively to the joint members, whereby each pipe length is permitted to shift lengthwise in the expansi  and contraction thereof, due to variations of temperature, while preventing separation of the pipe from the joint members in a manner to open or otherwise impair the joints. A suitable fluid tight joint is formed between each end of each pipe length and its joint member which is of a nature to permit the pipe to slip therein. As herein shown the ends of the pipes are reduced beyond their spirally grooved portions to fit closely in bores of the fittings at the joints or in union rings embodied in the joints and the packing rings which are embodied in the joints fit closely with a packing fit around said reduced portions of the pipe.

As shown in said drawings the pipe 10 is associated with a fitting 11, which, as shown, is an elbow fitting, but may be a valve, a T-fitting or the like, and with a union joint 12, by which two lengths of pipe are connected together. At the point between the pipe and fitting 11 a follower flange 14 fits over the end of and is interlocked with the pipe by means of interfitting spiral grooves and abutments 15, 16 on the pipe and the follower flange, respectively, and said follower flange opposes and coöperates with a flange 17 integral with the fitting 11. The end of the pipe exterior to its spiral groove is reduced to provide an extension 19 which enters and closely fits a bore 20 formed in the flanged end of the fitting. Said fitting is formed, exterior to said bore, with an annular recess 21, between the concave bottom of which and the inner concave end of the follower portion 22 of the flange 14, which enters said recess, a packing ring 23 is compressed. The flanges 14 and 17 are drawn together by means of bolts 25 which extend through registering openings in the flanges. In the union fitting 12 a union ring 27 fits closely over the adjacent reduced end portions 19 of two pipe lengths and constitutes part of the piping conduit. Packing rings 28, 28 surrounding said reduced pipe ends are compressed between the ends of said union ring and opposing shoulders 29, 29 of follower flanges 30, 30 which are interlocked with the pipe ends in the same manner as is the flange 14. The said flanges are drawn together to compress the packing rings between the follower flanges and the union ring by means of bolts 31, 31 which extend through registering openings in said flanges. As shown the ends of said union ring and the shoulders 29 of the flanges are concave and the ends of the packing rings are correspondingly tapered or conical. The inner side of the flanges overlap the ends of the union ring so that the packing pressure is brought to bear on all the exterior surfaces of the packing rings.

In both of the joints shown the spiral abutments 16 are made of less width than that of the grooves, so that there is provided a freedom of movement of the pipe lengths or bars, relatively to the abutments in the flanges, whereby said pipe lengths are free to move endwise relatively to the joint members upon expansion and contraction of the pipes, and such movement is permitted without in any manner affecting the integrity of the joints. The spiral grooves are of general V-shape but are preferably flattened at their bottoms 32 and the spiral abutments are likewise cut off or made blunt at their edges 33 and terminate short of the flattened bottoms of the grooves. The flattening of the bottoms of the grooves is especially advantageous in the pipe as it results in a smaller extent of weakening the pipe wall than if the grooves be carried down to a sharp V-point, and leaves a greater thickness in the reduced end portion or nipples 19 of the pipe. Whatever shape the interlocking grooves and abutments assume, the bases of the projections of the flanges will extend radially a distance beyond the peripheral surface of the pipe, as most clearly shown in Fig. 2. The particular spirally arranged interlocking connection between the pipe and flanges shown facilitates the assembling of the parts to producing a loose interfitting connection between the same, but such loose interlocking connection may be otherwise obtained while preserving the freedom of movement of the pipe relatively to the flanges for the purpose stated. The guiding engagement of the reduced or nipple ends 19 of the pipe with the joint structure maintains the pipe ends central in the flanges when the joints are assembled so that the lateral expansion and contraction spaces between the interlocking abutments are maintained, and also maintains the pipes in alinement. The spiral abutment of one part should extend into the groove of the other part at least a distance slightly greater than one-half the depth of said groove so as to prevent liability of the spiral abutment becoming crossed when the pipe is entered into the flange and before the advance reduced end of the pipe guidingly engages the bore in the fitting or in the union ring.

The spiral abutments of the pipe are shown as made in straight or cylindrical portions of the pipe instead of being tapered toward the outer ends thereof. This is a preferable arrangement, inasmuch as the interlocking grooves and abutments of the parts may be more readily made than if formed in tapered parts of the pipe and flanges. The reduced end portions or nipples of the pipe are also cylindrical so as to permit movement of said nipples in the packing rings without impairing the joints between the packing rings and pipe. In forming the nipples or reduced ends on a length or section of the pipe, the spiral groove and abutment are first cut in the pipe and then a part of the spiral abutment is cut away to give the plain cylindric form to said nipples.

The spiral grooves and abutments at the two ends of a pipe length may be formed one with a right hand and the other with a left hand pitch so that after the joints at the opposite ends thereof have been adjusted, the interfitting abutments at the opposite ends of the pipe may be eased off from each other, if necessary, by rotation of the pipe length in the proper direction. It will of course be understood that provision will be made for establishing and maintaining the proper relation of the abutments of the pipes and their associated flanges at the time of installation to correspond with temperature conditions, and this may be effected by a suitable gaging operation.

It will be understood that the invention is capable of adaptation in a variety of places where compensation for contraction and expansion of the piping is required, and the invention is not limited to the structural details shown, except as said details are hereinafter made the subject of specific claims.

I claim as my invention:

1. The combination with a pipe, of a follower flange through which the end of the pipe extends and which is adapted to coöperate with the flange of an adjacent end to end pipe or fitting to compress a packing about the pipe, the pipe and its flange being provided with interfitting spiral grooves and abutments, and the abutments of one part being spaced from the abutments of the other part to permit endwise movement of the pipe relatively to its follower flange.

2. The combination with a pipe, of a follower flange through which the end of the pipe extends, means coöperating with the follower flange to produce a fluid tight joint around said pipe, the pipe having sliding movement in said joint, and interfitting spiral abutments on the pipe and follower flange arranged to afford limited endwise movement of the pipe relatively to said flange.

3. The combination with a pipe provided at its end with an exterior spiral groove and an intervening spiral abutment, and beyond said groove with a reduced smooth end portion, and a follower flange through which the end of the pipe extends, of a fitting into which said reduced end portion extends, a packing surrounding said reduced end portion and interposed between said fitting and flange, and means for compressing said packing between said flange and fitting, the flange being provided with an interior spiral groove and abutment arranged to interfit with the spiral groove and abutment of the pipe, the abutments being of less width than said grooves.

4. The combination with a pipe provided at its end with an exterior spiral groove and an intervening spiral abutment, and a follower flange through which the pipe end extends, of a fitting into which said pipe end extends, a packing surrounding said pipe end and interposed between said fitting and flange, and means for compressing said packing between said flange and fitting, the flange being provided with an interior spiral groove and abutment arranged to interfit with the spiral groove and abutment of the pipe, the abutments being of less width than said grooves, and the abutments of the pipe extending into the groove of the flange a distance at least one-half the depth of said groove.

5. The combination with a pipe provided at its end with an exterior spiral groove and an intervening spiral abutment, and a follower flange through which the pipe end extends, of a fitting into which the pipe end extends, a packing surrounding said pipe end and interposed between said fitting and flange, and means for compressing said packing between said flange and fitting, the flange being provided with an interior spiral groove and abutment arranged to interfit with the groove and abutment of the pipe, the abutments of the flange and pipe being laterally separated by spaces to permit endwise movement of the pipe relatively to said flange, and the base of the spiral abutment of the flange being arranged radially outside of the circumferential line of the pipe.

6. The combination with a pipe, of a follower flange through which the end of the pipe extends, means coöperating with the follower flange to produce a fluid tight joint around the pipe, said pipe being provided near its end with an external spiral groove and an intervening spiral abutment formed in the straight or cylindric portion of the pipe, and the flange being provided with an internal spiral groove and abutment interfitting with those of the pipe, said abutments being of less width than the grooves.

7. The combination with a pipe, of a follower flange through which the end of the pipe extends, means coöperating with the follower flange to produce a fluid tight joint around the pipe, said pipe being provided near its end with an external spiral groove and an intervening spiral abutment formed in the straight or cylindric portion of the pipe, and beyond said groove with a reduced cylindrical nipple around which said joint is formed and adapted to enter the bore of a fitting connected to the pipe, and the flange being provided with an internal spiral groove and abutment interfitting with those of the pipe, said abutments being of less width than the grooves.

8. The combination with a pipe provided at its ends with external spiral grooves and abutments, the grooves and abutments at one end of the pipe being arranged at a reverse angle to those at the other end of the pipe, follower flanges surrounding said pipe and provided with internal spiral grooves and abutments which interfit with the grooves and abutments of the pipe ends and arranged to permit limited endwise movement of the pipe relatively to said flanges and means coöperating with said flanges to provide fluid tight joints about the ends of said pipe.

In testimony, that I claim the foregoing as my invention I affix my signature in the presence of two witnesses, this 22nd day of July A. D. 1909.

EUGENE F. OSBORNE.

Witnesses:
W. L. HALL,
W. GOLDBERGER.